United States Patent [19]
Winn

[11] Patent Number: 6,038,741
[45] Date of Patent: Mar. 21, 2000

[54] UNI-GRID AND MULTI-FACETED CLEANER FOR A COTTON GIN

[76] Inventor: William E. Winn, P.O. Box 702, Levelland, Tex. 79336

[21] Appl. No.: 09/288,666

[22] Filed: Apr. 9, 1999

Related U.S. Application Data

[60] Provisional application No. 60/081,743, Apr. 15, 1998.
[51] Int. Cl.$^7$ ........................................ D01B 1/04
[52] U.S. Cl. ........................... 19/48 R; 19/39; 19/44
[58] Field of Search ........................... 19/39, 40, 41, 19/44, 48 R, 49, 50, 51, 53, 64.5

[56] References Cited

U.S. PATENT DOCUMENTS

| | | |
|---|---|---|
| 500,102 | 6/1893 | Moran . |
| 3,984,898 | 10/1976 | Matsumura et al. . |
| 5,337,455 | 8/1994 | Pinto et al. ........................... 19/105 |
| 5,392,495 | 2/1995 | Horn ........................... 19/48 R |
| 5,412,844 | 5/1995 | Horn et al. ........................... 19/40 |

*Primary Examiner*—John J. Calvert
*Assistant Examiner*—Gary L. Welch
*Attorney, Agent, or Firm*—Finnegan, Henderson, Farabow, Garrett & Dunner, L.L.P.

[57] ABSTRACT

A multi-faceted cleaner for a cotton gin includes a casing having an inlet, an outlet, and an upper and lower portion. Disposed proximate to the upper portion of the casing is a separator that controls the air flow through the casing. The flow of air through the casing allows for the natural separation of the seed cotton as it enters the casing through the inlet. The seed cotton naturally separates into high density and low density seed cotton, where the low density seed cotton typically remains in the air flow and travels to the outlet and the high density seed cotton descends to a rotating spiked cylinder positioned proximate to the lower portion of the casing. Once received by the spiked cylinder, the seed cotton is cleaned by the interaction of the rotating cylinder and a grid. Positioned substantially beneath each cylinder is a saddle configured to house the grid. The configuration of the saddle and the grid permits the removal and insertion of the grid in the saddle. In particular, the grid is designed as a single piece of metal rolled to conform to the configuration of the saddle. To clean the seed cotton by extracting trash and other objects, the grid surface includes slot spacings that engage the seed cotton received by the rotating spiked cylinders. By inspecting the characteristics of the extracted objects, the grid may be removed from the saddle and replaced with a grid of a different spaced slot dimension better corresponding to the seed cotton, so as to enhance the desirability of the processed cotton without unduly delaying the machining process.

14 Claims, 13 Drawing Sheets

6,038,741

UNI-GRID AND MULTI-FACETED CLEANER FOR A COTTON GIN

This application claims benefit of Provisional Appl. No. 60/081,743 filed Apr. 15, 1998.

BACKGROUND OF THE INVENTION

1. Field of the Invention

The present invention concerns an aspect of the design and operation of cotton gins. More specifically, the present invention is directed toward a uni-grid and a multi-faceted cleaner incorporating the uni-grid for use in a cotton gin.

2. Description of the Prior Art

Since the cotton gin was first developed by Eli Whitney more than a century ago, the basic task of separating seeds, plant material, and other objects from the fibers of the cotton has remained a primary concern among cotton ginners. These various objects or "trash" are typically collected together with the raw cotton when it is harvested. This "trash" must be separated from the cotton fibers before the fibers can be processed into thread and, ultimately, into fabric.

Upon arrival to the cotton gin, the raw or harvested cotton is typically first received by a first stage cleaner or extractor. The extractor typically removes larger objects, such as burrs or sticks, while the cleaner removes smaller objects, such as seeds or plant material.

Generally, the cleaner includes a casing having an inlet for receiving the seed cotton and an outlet for expelling the seed cotton. The casing encloses a series of rotating spiked cylinders and fixed grids, where each particular grid is fixedly disposed beneath a particular cylinder. The conventional grid typically includes a plurality of square or circular bars individually welded across a series of intermediate heads, as illustrated in FIGS. 1&2. Bars 2 generally are dimensioned to traverse the entire depth of the casing from head 3 to head 7. Bars 2 are not only disposed alongside one another across intermediate heads 3, 4, 5, 6, 7, but also fixedly secured to each of heads 3, 4, 5, 6, 7, by a weldment. This weldment impedes the movability of the individual bars in relation to the intermediate heads.

The surface of the conventional grid, as constructed, includes slots 8, where the dimensions of slot 8 are determined by the distance between adjacent bars. To create the desired slot spacings, the ginner need only select a particular placement for bars 2 in relation to one another. For example, to remove large objects from the seed cotton, the slot spacings are increased in width by fixedly positioning the bars at an increased distance from one another. Alternatively, to remove only small objects from the seed cotton, the slot spacings are decreased in width by fixedly positioning the bars at a decreased distance from each other. Regardless of the chosen design, the bars, once welded to the intermediate heads, are securely fixed and, therefore, not easily removed and replaced.

To initially convey the seed cotton through the cleaner, a separator, located proximate to an upper portion of the casing, directs the air flow within the casing and projects the seed cotton and other objects to the cylinders. The separator directs the air flow in such a way that the air flow remains between the top portion of the cylinders and the upper portion of the casing. As such, the spacing between the cylinders and grids is considered to be an air plenum.

To clean the seed cotton, the spikes, which are disposed along the perimeter of the cylinder, receive the seed cotton from the inlet. Once received, the rotation of the cylinder causes the seed cotton to graze across the grid, thereby removing plant material, trash, and other objects from the seed cotton by capturing these objects and expelling them through the slot spacings. The remaining seed cotton is conveyed to the next cylinder in series where a similar process is repeated until the remaining seed cotton exits through the outlet.

Conventional cleaners, as illustrated in FIGS. 3–4 and disclosed in U.S. Pat. No. 5,392,495, issued to James L. Horn, typically incorporate a grid structure having large slot spacings, where the trash and seed cotton extracted through the slot spacings are reclaimed by a separate part of the cotton gin for further cleaning.

As depicted in FIG. 3, the cylinders of the conventional cleaner receive the seed cotton from the inlet of the cleaner. Through interaction with the cylinder, the grid removes the high density or heavy seed cotton, as well as any foreign objects, by permitting them to pass through the grid slot spacings. The low density or light seed cotton that remains is conveyed to the outlet of the casing. The high density seed cotton descending through the grid slots generally requires reclaiming and considerable recleaning because the heavy seed cotton typically includes more trash than even the harvested seed cotton. The reclaiming and recleaning of the heavy seed cotton requires additional equipment, such as an extractor, added to the cotton gin. These conventional cleaners also require several cleaning steps to sufficiently clean the seed cotton. Further, because the grids are fixed in the cleaner casing, the ginner cannot expeditiously change the grids, or more particularly the grid slot spacing, in response to the "trash" characteristics of the seed cotton.

The inability of conventional cleaners to maximize the operation and efficiency of its existing parts has created a specific need for an improvement in the design and operation of a cleaner for a cotton gin.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the multi-faceted cleaner of the present invention includes a casing having an inlet, an outlet, and an upper and lower portion. A separator, disposed proximate the upper portion of the casing, controls air flow velocity through the casing, thereby controlling the conveyance of the seed cotton entering the inlet to either the lower portion of the casing or to the outlet of the casing. A plurality of cylinders are positioned proximate to the lower portion of the casing, where each of the plurality of cylinders rotate about a respective axis and have spikes disposed along the perimeter of the cylinder to receive the seed cotton. Positioned substantially beneath the plurality of cylinders are a plurality of saddles. Housed in each of the plurality of saddles is a corresponding grid including spaced slots. As the seed cotton descends to the lower portion of the casing, it is received by the spiked cylinders and wiped against the spaced slots as the cylinders rotate, so that trash and other objects may be removed from the seed cotton. The continued rotation of the cylinders conveys any seed cotton remaining on the spiked cylinder to the next cylinder in series and eventually to the outlet of the casing. The configuration of at least one pair of the saddles and grids allows for the rapid removal and replacement of the grid from the saddle. In particular, the grid is designed as a single piece of metal rolled to conform to the configuration of the saddle. By rapidly replacing a grid with another grid of spaced slot dimensions better corresponding to the characteristics of the seed cotton, the cleaning process is enhanced without undue delay.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate preferred embodiments of the invention and, together with the description, serve to explain the principles of the invention. In the drawings.

DESCRIPTION OF THE PREFERRED EMBODIMENTS

Reference will now be made in detail to the present preferred embodiments of the invention, an example of which is illustrated in the accompanying drawings. Wherever possible, the same reference numbers will be used throughout the drawings to refer to the same or like parts.

In accordance with the present invention there is provided a multi-faceted cleaner for cleaning seed cotton for ginning that includes a casing having an inlet, an outlet and an upper and lower portion. A separator, disposed proximate the upper portion of the casing, controls air flow velocity through the casing, thereby controlling the conveyance of the seed cotton entering the inlet to either a plurality of cylinders positioned proximate to the lower portion of the casing or to the outlet of the casing. Each of the plurality of cylinders rotate about a respective axis and each have spikes disposed along the perimeter of the cylinder to receive the seed cotton. Positioned substantially beneath the plurality of cylinders are a plurality of saddles. Housed in each of the plurality of saddles is a corresponding grid including spaced slots. The seed cotton received by each spiked cylinder wipes along these spaced slots as the cylinder rotates to remove trash and other objects from the seed cotton. The continued rotation of the cylinder conveys any seed cotton remaining on the spiked cylinder to the next cylinder in the series and eventually to the outlet of the casing. The configuration of at least one pair of the saddles and grids allows for the rapid removal and replacement of the grid from the saddle. In particular, the grid is designed as a single piece of metal rolled to conform to the configuration of the saddle. By replacing a grid with another grid of spaced slot dimensions better corresponding to the characteristics of the seed cotton, the cleaning process is enhanced without undue delay.

Figure 1:
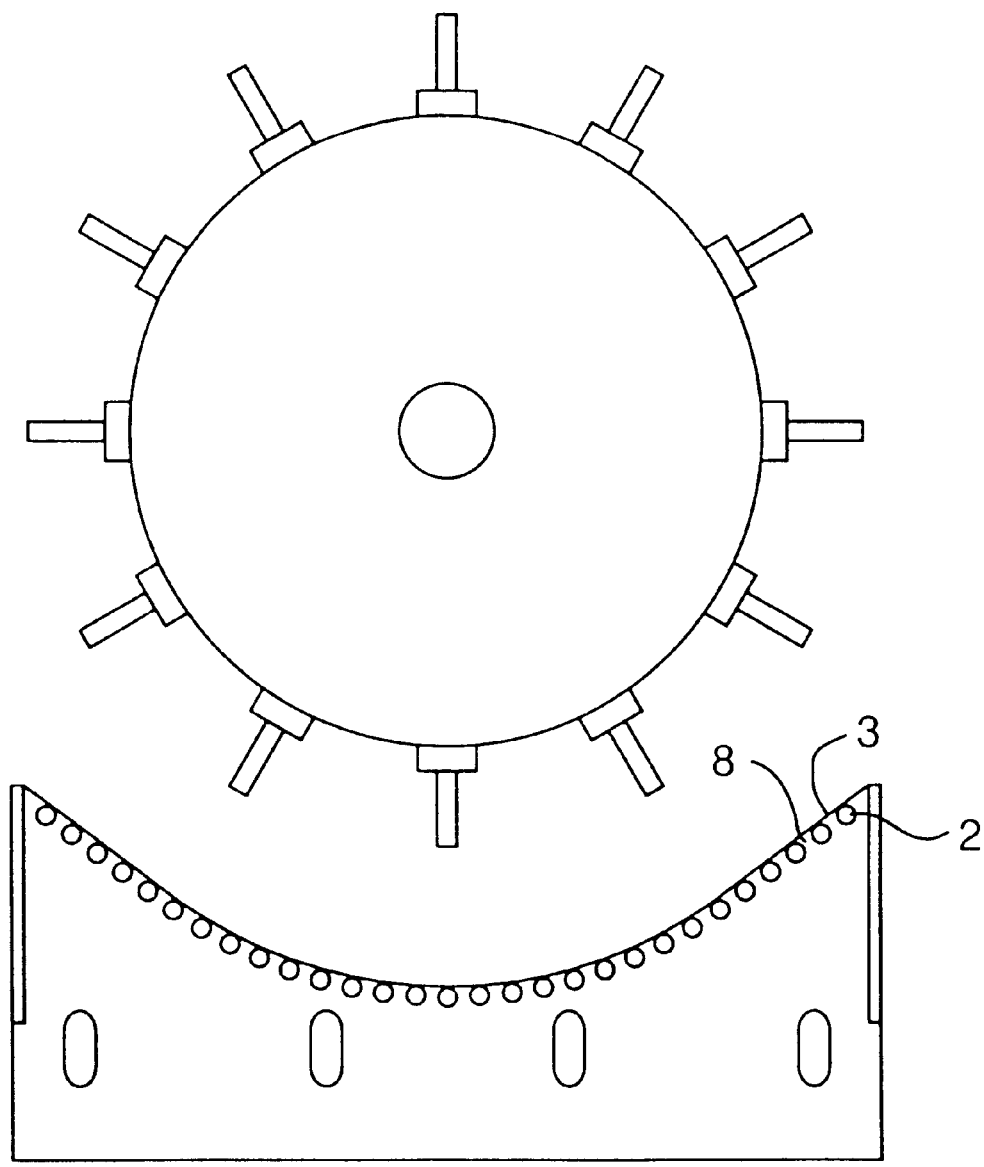
FIG. 1 is a side view illustration of a conventional cleaner of the prior art showing a conventional grid.
Figure 2:
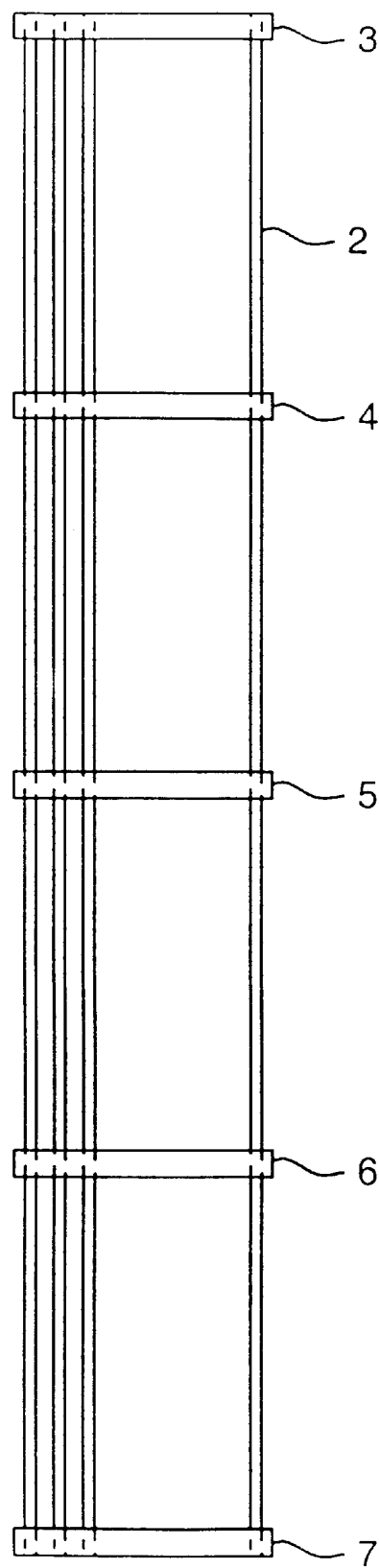
FIG. 2 is a top view illustration of a conventional cleaner of the prior art showing the conventional grid.
Figure 3:
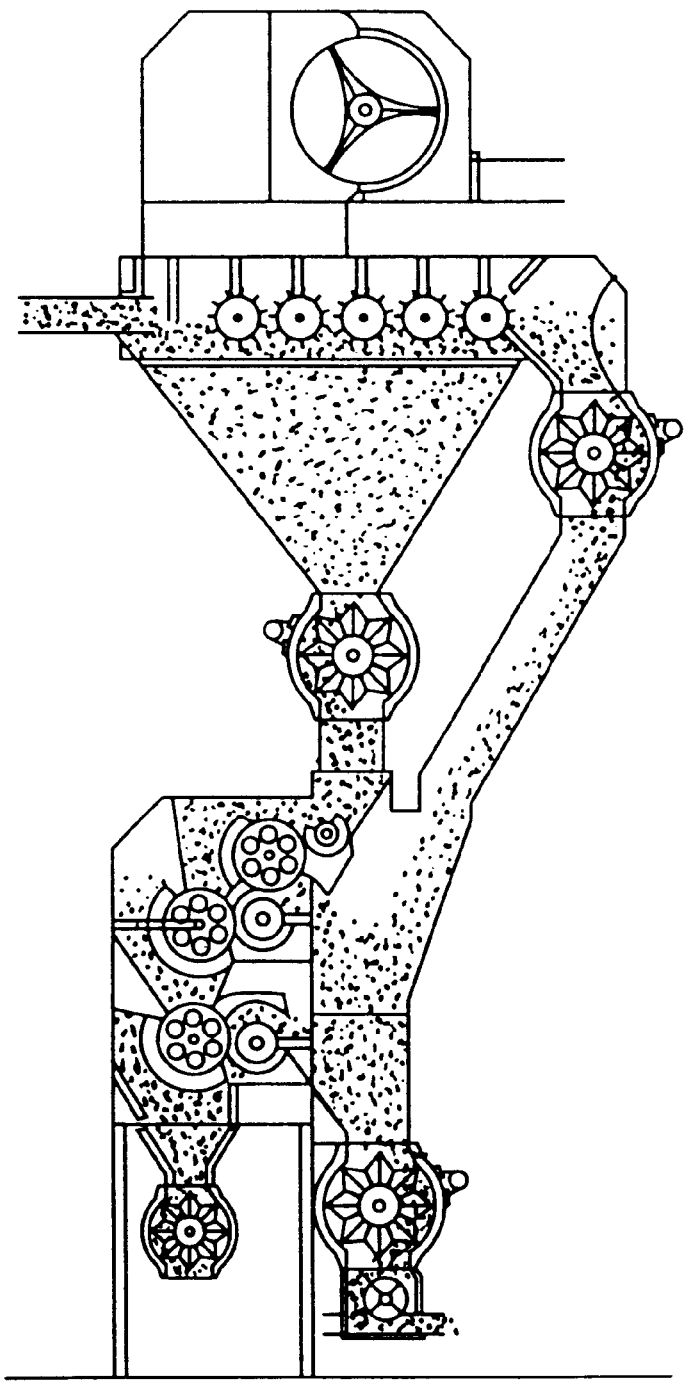
FIG. 3 is a side view illustration of a conventional cleaner of the prior art showing the conveyance of high density seed cotton and low density seed cotton by the cylinders and grids of the conventional cleaner.
Figure 4:
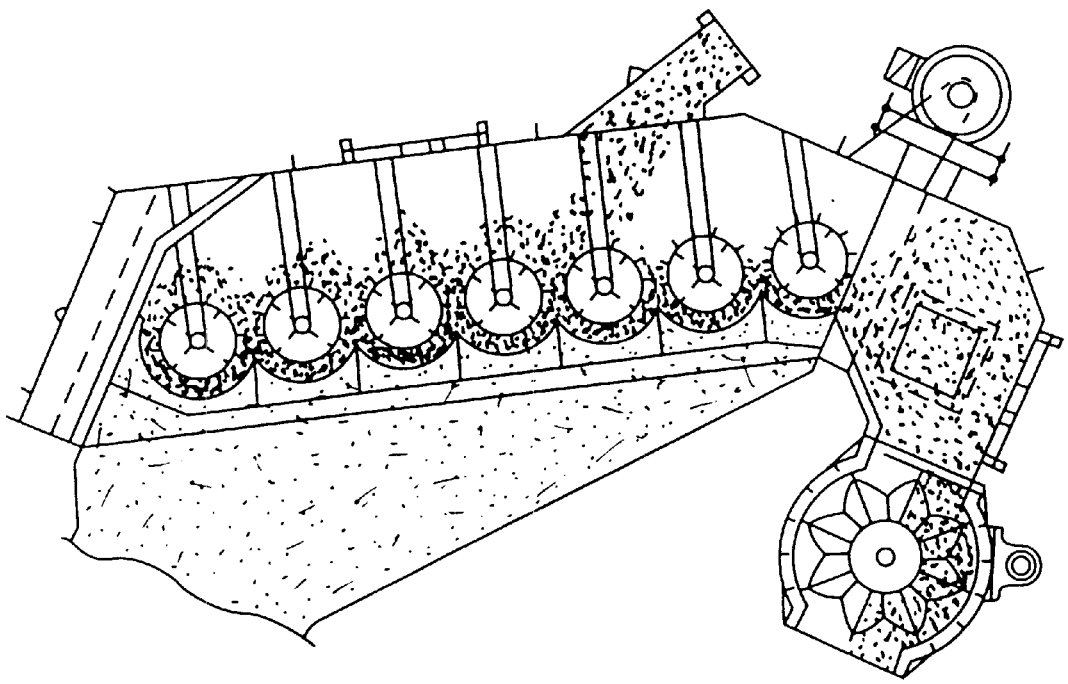
FIG. 4 is a side view illustration of a conventional cleaner of the prior art showing the conveyance of high density seed cotton and low density seed cotton by the cylinders and grids of the conventional cleaner.
Figure 5:
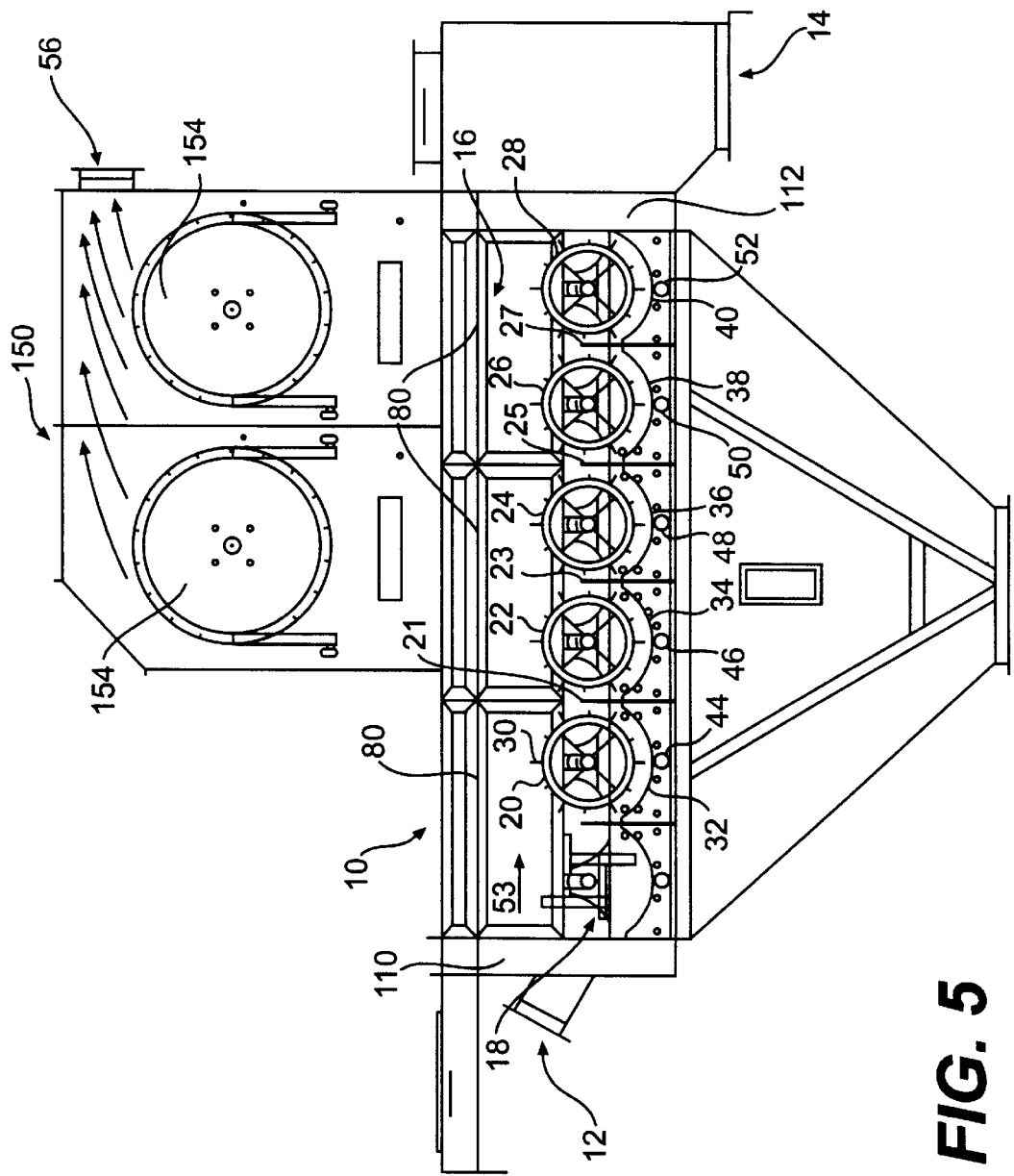
FIG. 5 is a side view illustration of a preferred embodiment of a multi-faceted cleaner according to the present invention.

The preferred embodiment of the multi-faceted cleaner of the present invention is depicted in FIG. 5. As illustrated, the multi-faceted cleaner includes casing 10 for cleaning the seed cotton. Casing 10 includes inlet 12, outlet 14, upper portion 16 and lower portion 18. Inlet 12 receives seed cotton that is pneumatically conveyed through casing 10. The multi-faceted cleaner of the present invention, cleans the seed cotton so that once it is expelled from outlet 14, the seed cotton has been reduced to a more desirable form where trash and other objects have already been removed from the cotton. As designed, the multi-faceted cleaner decreases damage to the cotton fiber by exposing the seed cotton to less machinery and unnecessary duplicative processing.

Figure 6:
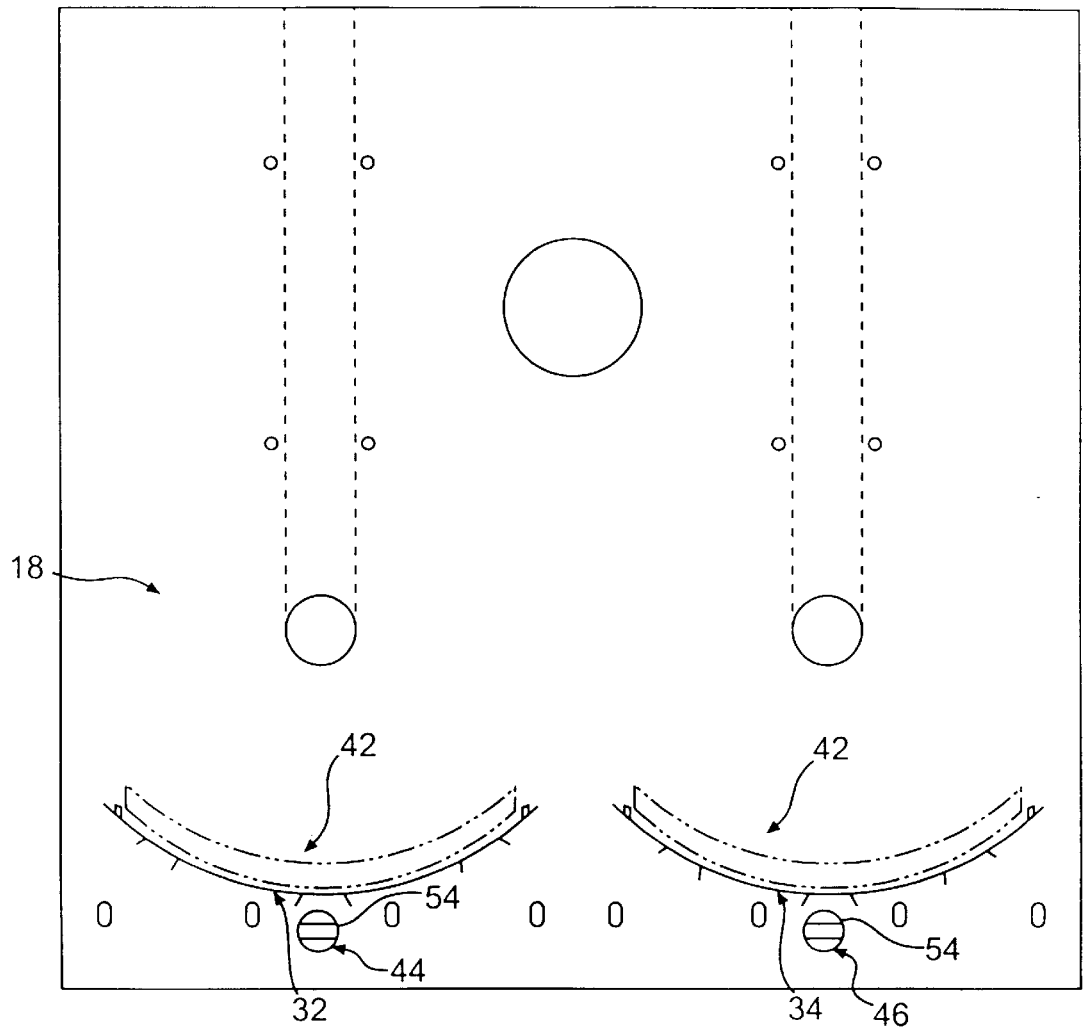
FIG. 6 is a side view illustration of a preferred embodiment of a saddle, grid, port, and tray as incorporated in the present invention.
Figure 7:
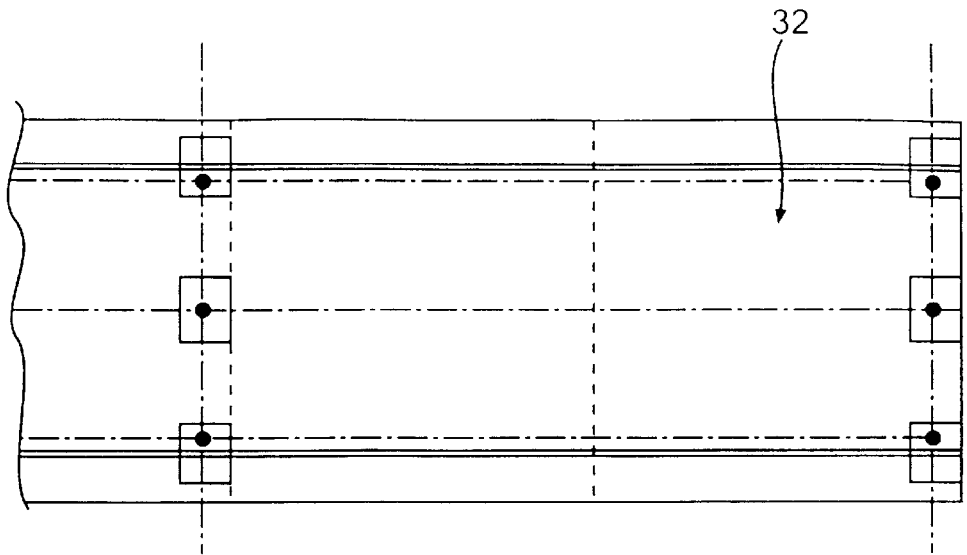
FIG. 7 is a top view illustration of a portion of the saddle as incorporated in the present invention.
Figure 8:
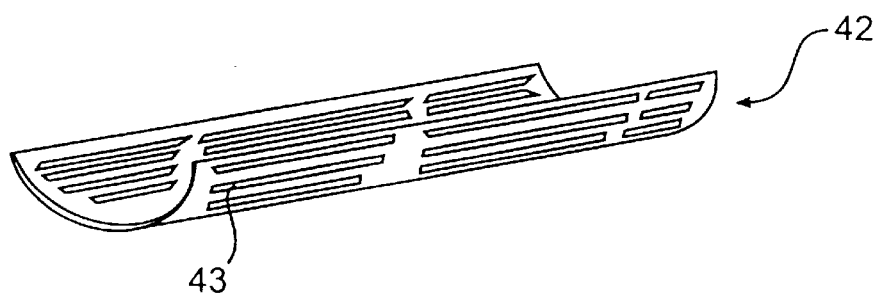
FIG. 8 is a three-dimensional view of the grid as incorporated in the present invention.
Figure 9:
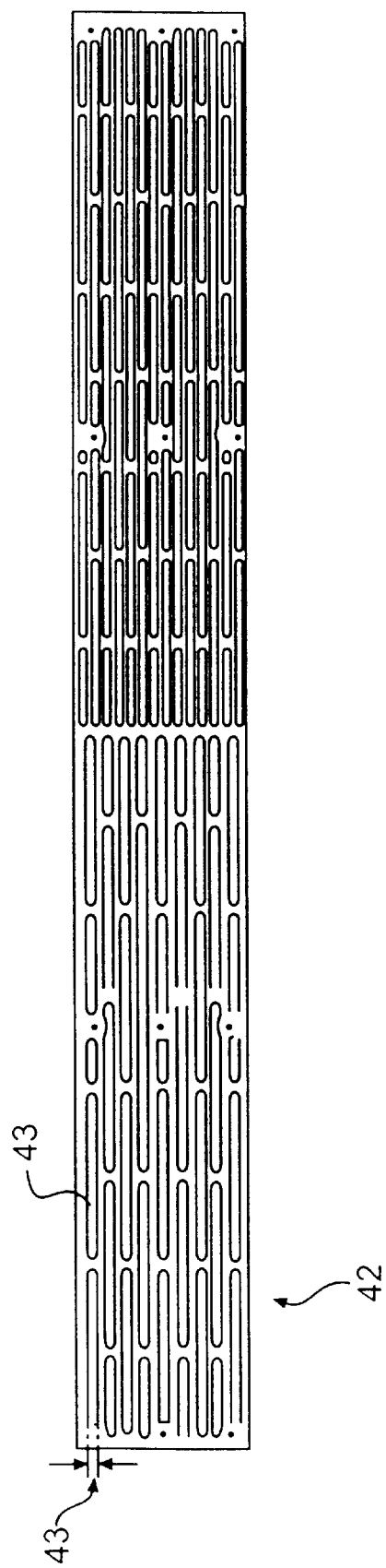
FIG. 9 is a top view illustration the grid as incorporated in the present invention.

As depicted in FIG. 5, lower portion 18 of casing 10 includes a series of cylinders 20, 22, 24, 26, 28 with a vertically adjustable vane 21, 23, 25, 27 disposed between each cylinder. Each cylinder rotates about a respective axis and includes spikes 30 positioned along its perimeter. Positioned substantially beneath cylinders 20, 22, 24, 26, 28 are saddles 32, 34, 36, 38, 40, respectively. As illustrated in FIGS. 5 and 6, each saddle has a concave structure corresponding to the outer perimeter formed by the rotation of the spiked cylinder. The saddle is configured to house grid 42 and permit the rapid removal and insertion of grid 42 in the saddle. As depicted in FIGS. 6 and 8, grid 42 is also concave in structure and includes spaced slots 43. FIG. 9 illustrates a preferred configuration of spaced slots 43. In contrast to the conventional grid, the design and construction of grid 42 allows for its rapid removal and replacement in the saddle. Preferably, grid 42 is constructed from a single sheet of flat metallic material, typically steel, where the dimensions of the steel sheet permit grid 42 to traverse the depth of casing 10.

Figure 14:
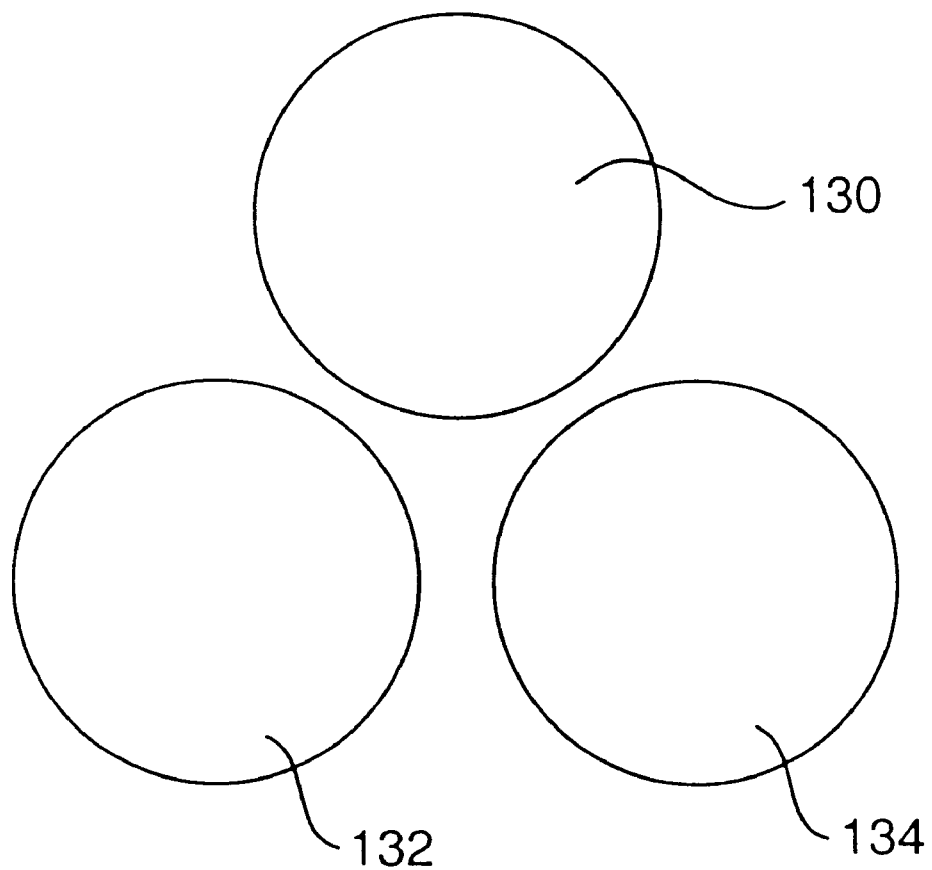
FIG. 14 is a side view illustration of a rolling station as incorporated in the present invention.

In a preferred manufacturing process of grid 42, the design of the grid surface (i.e. configuration of spaced slots 43) is first selected and created using a computer-aided drawing software package. Once the design pattern is formalized, the file storing the design is reformatted, so that it may be processed by a computer of a plasma cutter or similar machining tool. After processing the design file and receiving certain characteristic information on the steel sheet, such as the particular type of steel and the dimensions of the sheet, the machining tool cuts the design pattern on the steel sheet. The flat sheet of steel is then removed from the machining tool and transported to a rolling station. Preferably, the rolling station includes a set of three rollers 130, 132, 134 positioned in a triangular configuration, as depicted in FIG. 14. Roller 130 is positioned atop and between rollers 132, 134. Each of rollers 130, 132, 134 uniformly rotate about their central axis in either a clockwise or counter-clockwise direction. As such, the rollers, once receiving the steel sheet, convey it between top roller 130 and bottom rollers 132, 134. The position of top roller 130 in relation to bottom rollers 132, 134 and the rotary speed of rollers 130, 132, 134 determine the degree of curvature assigned to grid 42. Preferably, the degree of curvature assigned to grid 42 is substantially identical to the curvature of its respective saddle.

Once sufficiently rolled, grid 42 may be inserted in casing 10 atop a chosen set of saddles. A series of saddles are preferably disposed across the depth of casing 10, where each saddle is positioned at distinct intervals so as to provide adequate support for grid 42. Alternatively, grid 42 may be supported by a single saddle extending across the depth of casing 10. Regardless of the saddle configuration, grid 42 may be rapidly removed and inserted in the saddle by simply sliding grid 42 along the surface of the saddle(s). As will be discussed, this ability to rapidly remove and replace grid 42 proffers to the cotton ginner a number of previously unobtainable benefits.

Figure 10:
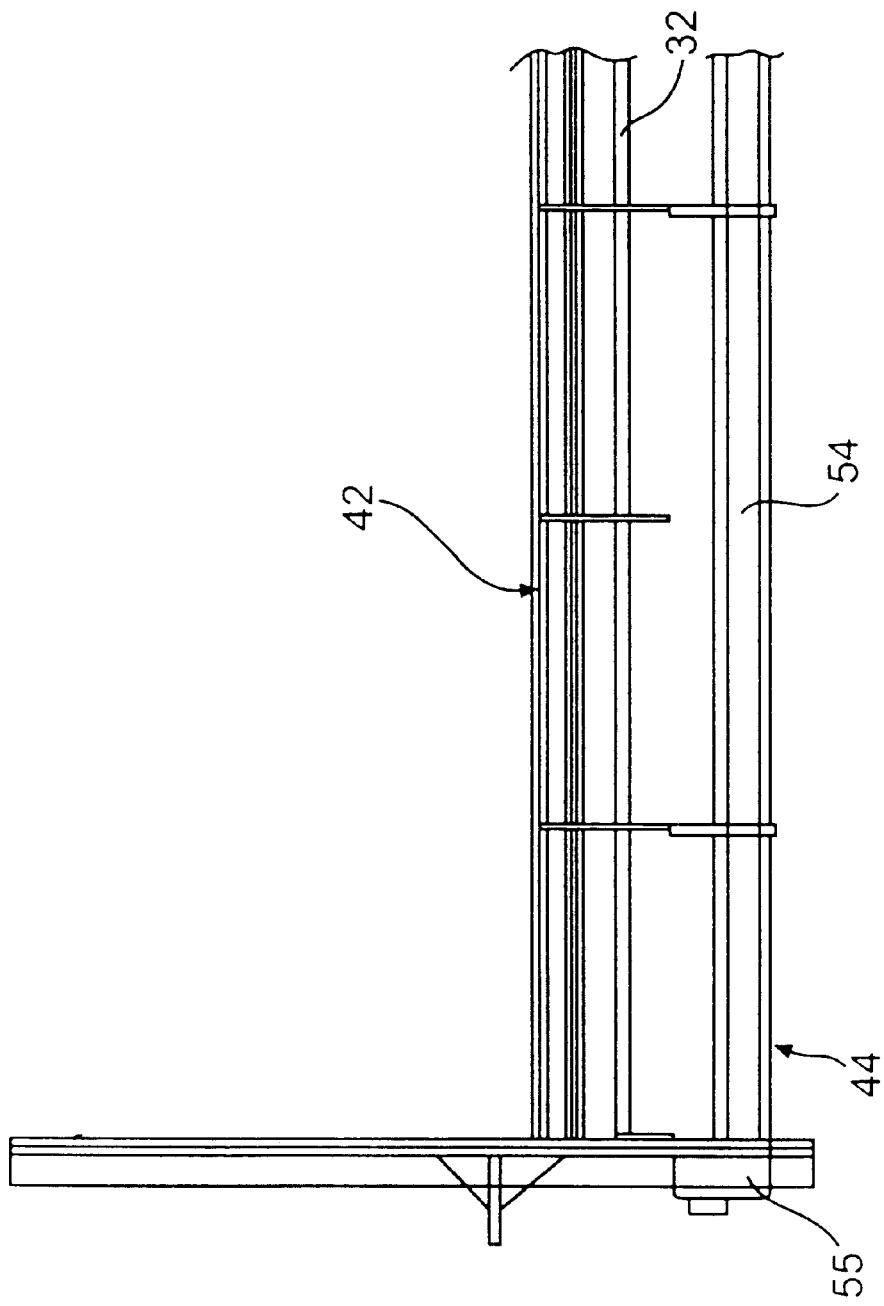
FIG. 10 is a front view illustration of a portion of the saddle, grid, port, and tray as incorporated in the present invention.

Returning to FIG. 5, positioned substantially beneath each saddle 32, 34, 36, 38, 40 and corresponding grid 42 are ports 44, 46, 48, 50, 52, respectively. As depicted in FIG. 10, the port extends beneath grid 42 and is configured to house tray 54 as well as permit the removal and insertion of tray 54 in the port. Port 44, 46, 48, 50, 52 includes an open upper surface so that tray 54, once inserted, may receive and retain a representative sample of objects descending through spaced slots 43 of grid 42. Preferably, each port 44, 46, 48, 50, 52 has an openable end portion 55 constructed of a transparent material to permit visual inspection of the objects descending through spaced slots 43.

Proximate to upper portion 16 of casing 10 is separator 50. Separator 50 controls the velocity of air flow 53 through casing 10 by adjusting air volume through the use of centrifugal fans 154. The air volume is dependent upon the rate of air flow expelled through exhaust 56 of separator 150. An increase in air volume corresponds to an increased air flow velocity and a decrease in air volume corresponds to a decreased air flow velocity. Air flow 53, emanating from separator 150, advances the seed cotton into casing 10 through inlet 12 and toward outlet 14.

Sufficiently high air flow velocities create a natural separation in the seed cotton as it travels through casing 10. For example, upon entering casing 10 through inlet 12, the seed cotton may either descend to the cylinders or remain in the air flow. Generally, high density or heavy seed cotton separates and descends to the cylinders, and low density or light seed cotton remains in air flow 53 and travels beyond the cylinders to outlet 14. The low density seed cotton generally includes more desirable cotton fibers, while the high density seed cotton generally includes trash and other foreign objects that increase the weight of the seed cotton. Typically, the heavier or more dense the seed cotton, the earlier upstream it separates from air flow 53 and descends toward lower portion 18 of casing 10.

Although the density characteristics of the seed cotton entering inlet 12 are beyond the control of the multi-faceted cleaner, the natural separation point of the seed cotton is within the ginner's control. For example, by increasing the velocity of air flow 53 through casing 10, the natural separation of the seed cotton occurs closer to inlet 12. And vice versa, by decreasing the velocity of air flow 53 through casing 10, the natural separation of the seed cotton occurs farther from inlet 12. Thus, by varying the velocity of air flow 53, the ginner may decide how much machining the seed cotton will receive by controlling how early upstream the high density seed cotton separates and descends to the cylinders for processing.

The separation of the high and low density seed cotton not only decreases unnecessary cotton fiber damage, it also reduces the volume of seed cotton traveling between the cylinders and grids. As opposed to a conventional cleaner, only a portion of the seed cotton is machined by the cylinder and grid section of casing 10, because the remaining portion of seed cotton continues in air flow 53 until exiting casing 10. By reducing the amount of seed cotton conveyed between the cylinder and grid section, the volume of the seed cotton traveling through the multi-faceted cleaner may be increased. Accordingly, the ginner may produce cotton of improved quality and quantity by reducing the amount of seed cotton exposed to cylinder-grid machining.

Returning to FIG. 5, as the high density seed cotton descends to the cylinders, spikes 30, positioned along the perimeter of each cylinder 20, 22, 24, 26, 28, initially receive the seed cotton. The rotation of the cylinder and corresponding spikes 30 swipe the seed cotton along spaced slots 43 of grid 42, thereby removing trash and other objects from the seed cotton by releasing these objects through the spaced slots 43 of grid 42. The seed cotton remaining on spikes 30 is further rotated by the cylinder and projected toward an adjacent vane. The ginner may control the vertical height of a particular vane 21, 23, 25, 27 depending upon the characteristics of the seed cotton. For example, by adjusting the vane height to a decreased level, the seed cotton continues to the next cylinder in series for further cleaning. Alternatively, by adjusting the vane height to an increased level, the seed cotton projected from the cylinder is conveyed toward air flow 53. Depending upon the density characteristics of the seed cotton projected to air flow 53, the seed cotton may remain in air flow 53 or return to the cylinders. Typically, the low density seed cotton remains in air flow 53 until exiting casing 10 through outlet 14, while the high density seed cotton returns to the next cylinders in series for continued cleaning.

The design and configuration of the multi-faceted cleaner enables various changes in the cleaning elements, where these changes can produce optimal results for the particular seed cotton being cleaned. For example, the transparent characteristic of end portion 55 of the port allows for the continued visual inspection of the objects removed from the seed cotton by grid 42. From this visual inspection, the ginner may determine that a grid with a different spaced slot configuration may be more effective in the cleaning process. Because of the rapid removability and replacement of grid 42, installation of the more effective grid may occur without unduly delaying the cleaning process. To remove grid 42 from its respective saddle, the ginner need only slide grid 42 out of the saddle. Similarly, a different grid of an improved spaced slot configuration may be inserted into the vacant saddle by simply sliding the grid in the saddle. Thus, because of the design of grid 42, the ginner may easily and rapidly replace a particular grid 42 and its spaced slot configuration 43 in response to the characteristics of the objects removed from the seed cotton. Such control enhances the seed cotton's desirability without unduly delaying the ginning process.

Alternatively, assuming a more detailed inspection of the removed objects is desired, tray 54 may be removed from its corresponding port to permit a physical inspection of the removed objects. Tray 54, inserted in the port and positioned substantially beneath grid 42, receives and retains a representative sample of the objects removed from the seed cotton. To remove tray 54 from the port, the ginner need only slide tray 54 out of the openable end 55 of the port. Once tray 54 is removed and a detailed inspection of the objects received in tray 54 is completed, the ginner may determine, with increased accuracy, that a grid of a different spaced slot configuration may be more effective in the cleaning process. As previously described, the ginner may immediately replace the grid and its particular spaced slot configuration in response to the characteristics of the objects removed from the seed cotton.

These tray inspections not only allow the ginner to substitute a particular grid configuration in response to the characteristics of the removed objects, but also enable the ginner to intelligently adjust the vertical height of a corresponding vane as well as the air flow velocity through the casing. In situations where a tray inspection indicates a more desirable or low density seed cotton, the adjacent vane may be adjusted to an increased height to project the seed cotton from the cylinder and into the air flow. Assuming the air flow velocity is sufficient to permit a natural separation of the seed cotton, the low density seed cotton will remain in the air flow and continue to the outlet, while any remaining high density seed cotton will return to the next cylinders in series for continued cleaning. Alternatively, the adjacent vane may require adjustment to a decreased height to facilitate the continued cleaning of the seed cotton. The decreased height of the vane permits the seed cotton to continue to the next cylinder in series so that any trash remaining in the seed cotton may be further extracted.

The velocity of air flow 53 through casing 10 also may be adjusted in response to the characteristics of the objects extracted by grid 42. To avoid unnecessary swiping of the seed cotton against upstream grids 42, the velocity of the air flow may be decreased, so that the natural separation of the seed cotton occurs further down stream. By eliminating any unnecessary machining, the quality and desirability of the resultant cotton is enhanced. Alternatively, where the seed cotton requires exposure to the upstream grids for proper cleaning, the air flow velocity may be increased, thus, naturally separating the seed cotton further upstream. As separated, the high density seed cotton receives additional cleaning as the seed cotton descends towards cylinders and grids further upstream and proximate to the inlet.

Figure 11:
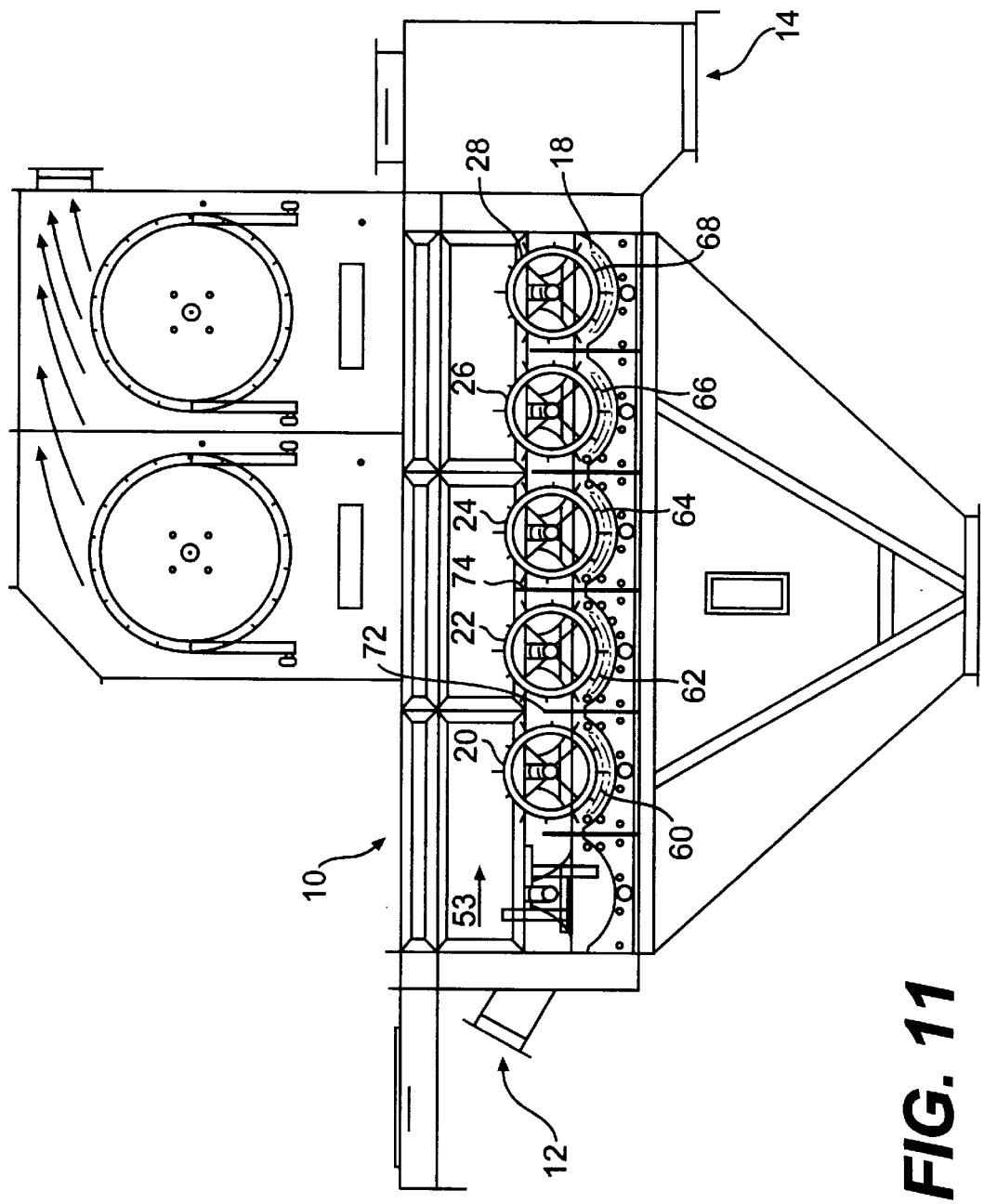
FIG. 11 is a side view illustration of an alternative embodiment of the multi-faceted cleaner according to the present invention.

In addition to the improved quality of the processed cotton, the increased control offered by the multi-faceted cleaner of the present invention allows the ginner to combine the processing steps of the conventional cleaner and conventional extractor into one machine. For example, as illustrated in FIG. 11, grids 60, 62 positioned nearest inlet 12 may include spaced slots 43 having narrow dimensions, while the grids 64, 66, 68 positioned near outlet 14 include spaced slots 43 having wider dimensions. By sufficiently increasing the velocity of air flow 53, the natural separation between the low density and high density seed cotton occurs shortly after the seed cotton enters inlet 12. As the high density seed cotton separates and descends toward cylinder 20, it is received by spikes 30 and wiped along spaced slots 43 of grid 60 as the cylinder rotates. Because of the narrow spaced slot configuration of grid 60, the objects removed from the seed cotton resemble those objects typically removed by a conventional cleaner. To permit further cleaning of the seed cotton, early upstream vane 72 is adjusted to a relatively low vertical height so that the seed cotton wiped along grid 60 continues to cylinder 22 and grid 62.

However, vane 74, positioned just before grids 64, 66, 68, is adjusted to an increased vertical height. As adjusted, the seed cotton conveyed to vane 74 is conveyed toward air flow 53. Depending upon the characteristics of the projected seed cotton, the seed cotton may remain in air flow 53 and continue to outlet 14, or return to cylinder 24. As previously discussed, the seed cotton remaining in air flow 53 is frequently the low density or more desirable seed cotton, while the seed cotton returning to cylinders 24 is the high density seed cotton.

The high density seed cotton returning to lower portion 18 is analogous to the seed cotton reclaimed and recleaned by a conventional extractor. But instead of conveying this high density seed cotton to a separate conventional extractor, the cleaning elements of the multi-faceted cleaner of the present invention are configured to mimic the cleaning characteristics of a conventional extractor. For example, as previously described, the widened configuration of spaced slots 43 of grids 64, 66, 68 permits the removal of objects from the seed cotton that resemble those objects typically removed by a conventional extractor. Thus, the multi-faceted cleaner of the present invention may be configured to eliminate the need for additional conventional ginning machinery.

Figure 12:
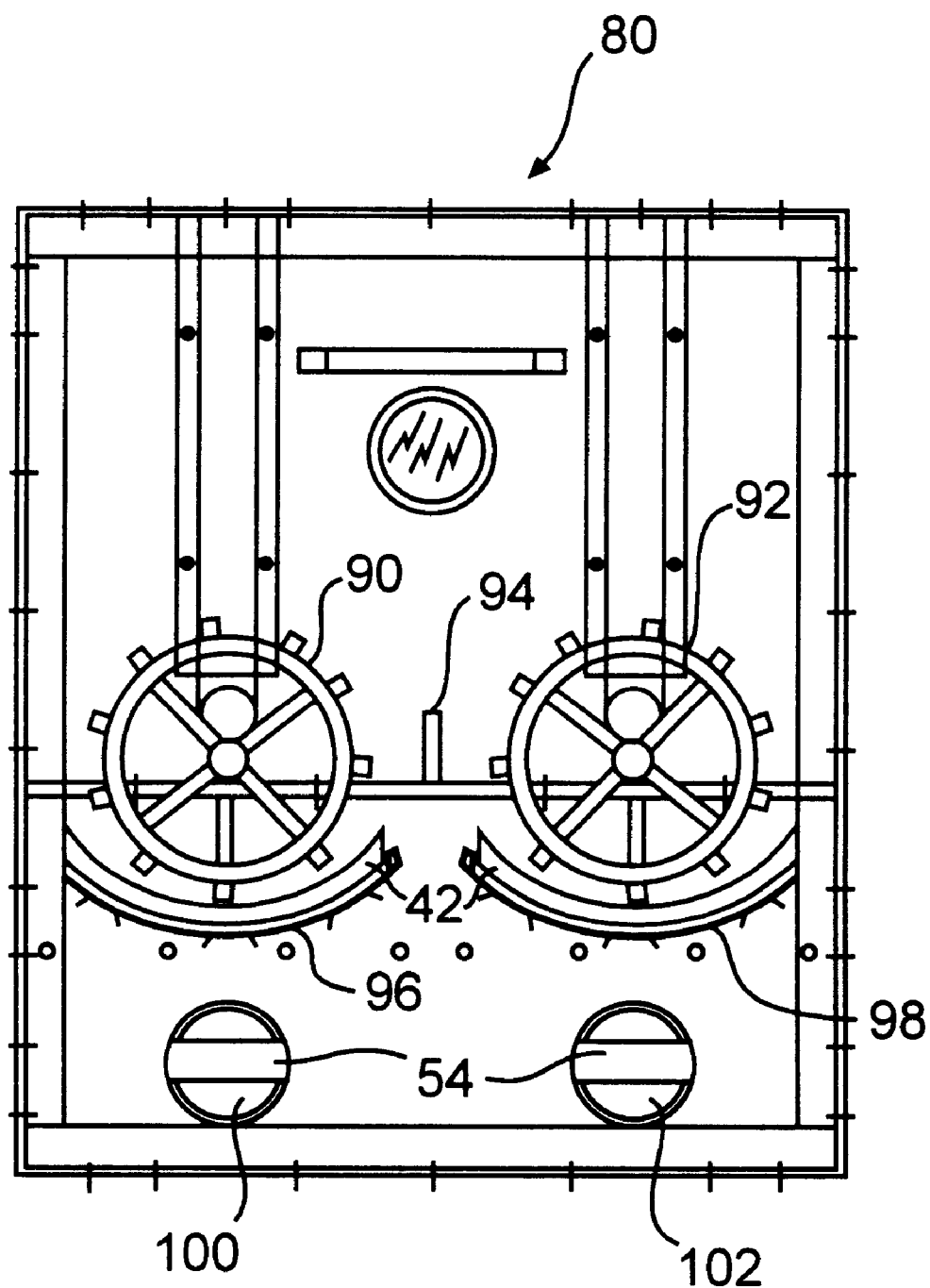
FIG. 12 is a side view illustration of a module of a multi-faceted cleaner as incorporated in the present invention.

The multi-faceted cleaner of the present invention further offers a modular design that permits the addition or removal of a set of cleaning elements as the ginner desires. The configuration of casing 10 allow it to receive one or more modules 80. Because module 80 has neither a predetermined inlet or outlet, its design permits any number of modules 80 to be added or removed at any position between inlet 12 and outlet 14 of casing 10. As illustrated in FIG. 12, each module 80 includes two rotating spiked cylinders 90, 92 positioned in series; vertically adjustable vane 94 positioned between cylinders 90, 92; saddles 96, 98 respectively positioned beneath each cylinder 90, 92; and ports 100, 102 respectively positioned beneath each saddle 96, 98 and configured to house trays 54.

Figure 13:
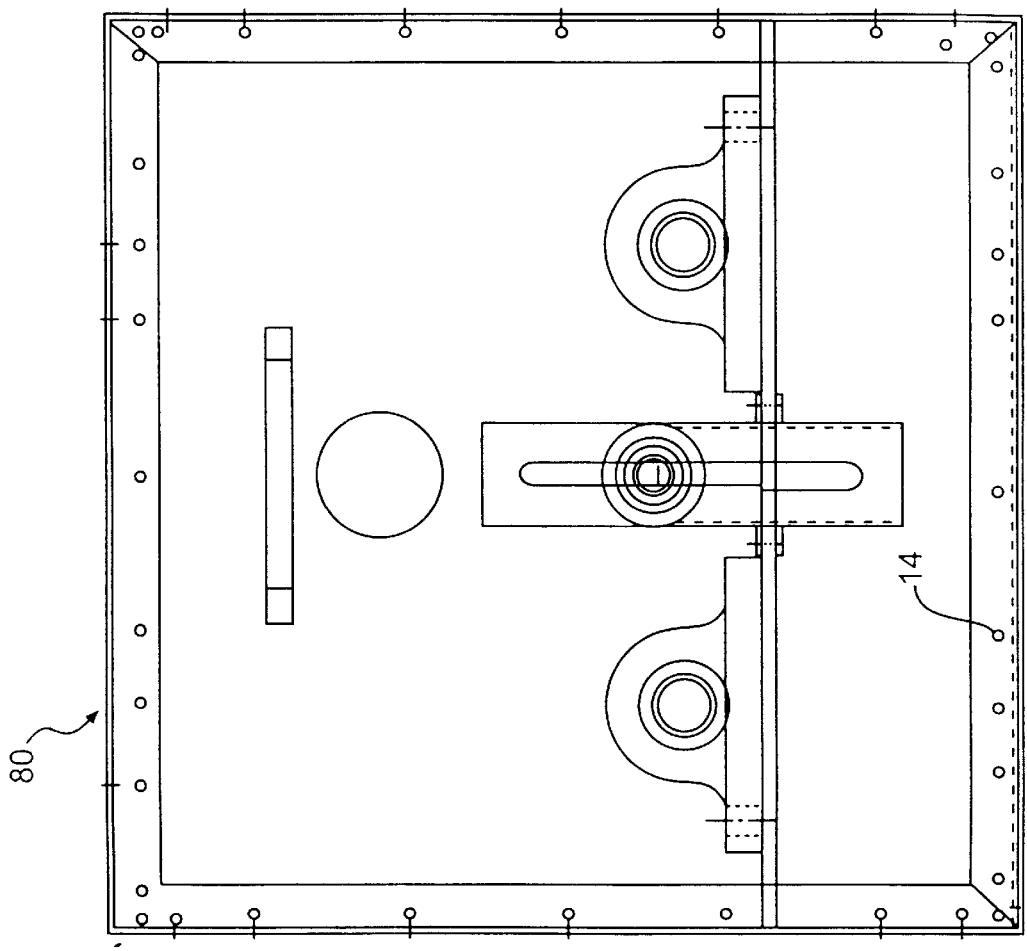
FIG. 13 is a front view illustration of the module as incorporated in the present invention.

As illustrated in FIG. 5, the generic design and configuration of casing 10 and module 80 allow for the insertion of module 80 adjacent any of casing inlet portion 110, casing outlet 112, or an adjoining module 80. Each of casing inlet portion 110, casing outlet portion 112, or module 80 have a bolt system, as shown in FIG. 13. This bolt system includes a series of bolt holes 114 disposed along the edges of casing inlet portion 110, casing outlet portion 112, and module 80, where each bolt hole 114 is configured to receive a bolt. Because the placement of each bolt hole 114 on casing inlet portion 110, casing outlet portion 112, and module 80 are identical, module 80 may be secured to any of the previously mentioned casing structures. Use of this bolt system permits the ginner to insert and fasten an additional module 80 to any respective adjoining structure without the need for welding or other machining. For example, to insert an additional module 80 in casing 10, the ginner would first unbolt an existing module 80 from one of its adjoining structures and sufficiently separate the existing module 80 from its adjoining structure to allow for the insertion of an additional module 80. After inserting additional module 80 and aligning the respective bolt patterns, new module 80 may be securely bolted in place. If the ginner instead desires to remove an existing module 80 from casing 10, the ginner need only unbolt and remove existing module 80 from casing 10, reposition the remaining casing structures adjacent one another, and securely bolt them in place. Although the above disclosure and associated drawings disclose only the preferred bolt system, alternative systems may be used which possess similar fastening characteristics.

This ability to easily add or remove a module allows the ginner to clean seed cotton with enhanced control without unduly delaying the ginning process. If the ginner determines that the seed cotton requires additional cleaning, the ginner need only insert an additional module or modules that include the cleaning characteristics desired. Alternatively, if the seed cotton is being exposed to unnecessary machining, the ginner may simply remove a module or modules from the existing configuration. Regardless of the particular needs, the modular design of the multi-faceted cleaner of the present invention allows the ginner to customize the cleaner in order to produce a more desirable cotton.

As described above, the construction of the multi-faceted cleaner of the present invention enables the ginner to extract large objects, such as burrs, and small objects, such as lint, in a single machine. The ginner may maximize the cleaning characteristics of the multi-faceted cleaner by adapting the grids, vanes, and air flow to better correspond with the needs of the particular seed cotton, by simply inspecting the objects extracted by the grids. Furthermore, because of the modular capabilities of the multi-faceted cleaner, the ginner may manipulate, add, or remove a set of cleaning elements in response to the characteristics of the seed cotton.

Although the previous description speaks of only seed cotton, the multi-faceted cleaner of the present invention is not limited to the cleaning of seed cotton. Indeed, the multi-faceted cleaner may be used to process cotton that has already had the seed removed from it as well as the trash and other objects removed from the seed cotton. In essence, the adaptability of the multi-faceted cleaner permits it to process various products possessing similar properties and cleaning characteristics as seed cotton. These other products may include, for example, cellulose or synthetic cotton.

It will be apparent to those skilled in the art that various modifications and variations can be made in the multi-faceted cleaner of the present invention and in construction of this multi-faceted cleaner without departing from the scope or spirit of the invention.

Other embodiments of the invention will be apparent to those skilled in the art from consideration of the specification and practice of the invention disclosed herein. It is intended that the specification and examples be considered as exemplary only with a true scope and spirit of the invention being indicated by the following claims.

What is claimed:

1. A multi-faceted cleaner for a cotton gin for removing objects from seed cotton, comprising:

a casing with upper and lower portions;

an inlet to the casing for receiving the seed cotton;

an outlet from the casing for expelling the seed cotton after the objects have been removed;

at least one rotatable cylinder proximate to the lower portion of the casing having spikes disposed thereon for engaging the seed cotton;

a saddle positioned below the at least one cylinder; and a slidably removable grid positioned in the saddle having spaced slots through which the objects pass when removed from the seed cotton.

2. The multi-faceted cleaner of claim 1, further comprising:

a port positioned below the saddle and configured to house a tray.

3. The multi-faceted cleaner of claim 2, further comprising:

a transparent cover over the port, permitting visual inspection of objects removed from the seed cotton.

4. The multi-faceted cleaner of claim 1, further comprising:

a separator proximate to the upper portion of the casing for controlling air flow through the casing to separate the seed cotton according to the seed cotton's density.

5. The multifaceted cleaner of claim 1, wherein the cleaner comprises a plurality of cylinders and a vane vertically positionable between two of the plurality of cylinders.

6. The multi-faceted cleaner of claim 1, wherein the cleaner comprises a plurality of cylinders arranged in pairs.

7. The multi-faceted cleaner of claim 6, further comprising:

a vane vertically positionable between at least one pair of the plurality of cylinders.

8. The multi-faceted cleaner of claim 1, wherein the removable grid is a rolled sheet of steel having spaced slots.

9. A multi-faceted cleaner for a cotton gin for removing objects from seed cotton, comprising:

a casing with upper and lower portions:

an inlet to the casing for receiving the seed cotton;

an outlet from the casing for expelling the seed cotton after the objects have been removed:

at least one rotatable cylinder proximate to the lower portion of the casing having spikes disposed thereon for engaging the seed cotton;

a saddle positioned below the at least one cylinder;

a slidably removable grid positioned in the saddle having spaced slots through which the objects pass when removed from the seed cotton;

a port positioned below the saddle; and a tray removably positioned in the port to receive some of the objects removed from the seed cotton.

10. A multi-faced cleaner for a cotton gin for removing objects from seed cotton, comprising:

a casing with upper and lower portions;

an inlet to the casing for receiving the seed cotton;

an outlet from the casing for expelling the seed cotton after the objects have been removed; and at least one module removably positioned between the inlet and the outlet of the casing, the at least one module including at least one rotatable cylinder proximate to the lower portion of the casing having spikes disposed thereon for engaging the seed cotton, a saddle positioned below the at least one cylinder, and a slidably removable grid positioned in the saddle having spaced slots through which the objects pass when removed from the seed cotton.

11. The multi-faceted cleaner of claim 10, wherein the module comprises a plurality of cylinders and a vane vertically positionable between two of the plurality of cylinders.

12. The multi-faceted cleaner of claim 10, wherein the module comprises a plurality of cylinders arranged in pairs.

13. The multi-faceted cleaner of claim 12, further comprising:
 a vane vertically positionable between at least one pair of the plurality of cylinders.

14. The multi-faceted cleaner of claim 10, wherein the cleaner comprises a plurality of modules arranged in series.

\* \* \* \* \*

UNITED STATES PATENT AND TRADEMARK OFFICE
CERTIFICATE OF CORRECTION

PATENT NO. : 6,038,741
DATED : April 21, 2000
INVENTOR(S) : William E. Winn

Page 1 of 1

It is certified that error appears in the above-identified patent and that said Letters Patent is hereby corrected as shown below:

<u>Column 10, claim 10,</u>
Line 47, change "multi-faced" to -- multi-faceted --.

Signed and Sealed this

Thirteenth Day of November, 2001

Attest:

*Attesting Officer*

NICHOLAS P. GODICI
*Acting Director of the United States Patent and Trademark Office*